(12) United States Patent
Lee

(10) Patent No.: US 6,429,545 B1
(45) Date of Patent: Aug. 6, 2002

(54) AUTOMOBILE POWER SUPPLY SYSTEM FOR PREVENTING UNCONTROLLED ACCELERATION

(75) Inventor: Kwang-Hee Lee, Yongin (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/470,597

(22) Filed: Dec. 22, 1999

(30) Foreign Application Priority Data

Jul. 28, 1999 (KR) .......................................... 99-30857

(51) Int. Cl.[7] .............................................. B60R 22/00
(52) U.S. Cl. .................................. 307/10.6; 200/61.53
(58) Field of Search ........................... 200/61.48, 61.53; 307/10.6, 121; 180/282, 283

(56) References Cited

U.S. PATENT DOCUMENTS

| | | | | |
|---|---|---|---|---|
| 2,204,735 A | * | 6/1940 | Smith ........................... 200/282 |
| 2,842,630 A | * | 7/1958 | Lucibello ................... 200/61.48 |
| 3,034,097 A | * | 5/1962 | English et al. ............... 708/283 |
| 3,098,538 A | * | 7/1963 | Hu .............................. 180/282 |
| 3,198,899 A | * | 8/1965 | Hitchcock ................. 200/61.48 |
| 3,229,109 A | * | 1/1966 | Wilson ........................ 307/10.6 |
| 3,259,202 A | * | 7/1966 | Griffeth ....................... 180/283 |
| 3,410,359 A | * | 11/1968 | Mollison .................... 180/282 |
| 3,553,482 A | * | 1/1971 | Tavis .......................... 307/121 |
| 3,871,473 A | * | 3/1975 | Castonguay ................ 180/282 |
| 3,889,774 A | * | 6/1975 | Schwenk .................. 200/61.53 |
| 4,221,278 A | * | 9/1980 | Ponzo ......................... 180/283 |
| 4,308,438 A | * | 12/1981 | Rossel et al. ............... 307/121 |
| 5,389,824 A | * | 2/1995 | Moroto et al. ............. 180/283 |
| 5,602,429 A | * | 2/1997 | Scgiebelhuth ............... 307/121 |

* cited by examiner

Primary Examiner—Brian Sircus
Assistant Examiner—Roberto Rios
(74) Attorney, Agent, or Firm—Christie, Parker & Hale, LLP

(57) ABSTRACT

Disclosed is an automotive power supply system for preventing uncontrolled acceleration that includes a battery, an ignition switch electrically connected to the battery, and an acceleration responses switch provided between the battery and the ignition switch.

7 Claims, 6 Drawing Sheets

AUTOMOBILE POWER SUPPLY SYSTEM FOR PREVENTING UNCONTROLLED ACCELERATION

BACKGROUND OF THE INVENTION (a) Field of the Invention

The present invention relates to a power supply system of an automotive vehicle that is capable of preventing the vehicle from suddenly accelerating regardless of a driver's intention so as to insure the vehicle's stability and the driver's safety.

(b) Description of the Related Art

Generally, an automatic torque converter consists of a torque converter, a gear train connected to the torque converter for achieving a wide range of speeds and loads, and a hydraulic control system for selecting a necessary gear ratio by applying or releasing pressure to or from desired friction elements.

Thus, in a vehicle equipped with an automatic transmission, gear shifting is performed by an electric control unit (ECU), which sends electric control signals to a plurality of solenoid valves for controlling hydraulic flows, a medium for operating friction elements.

Recently, traffic accidents caused by sudden acceleration without relation to the driver's intention have been reported and one reason of these sudden accelerations is thought to be malfunctions of the solenoid valves caused by electromagnetic waves.

However, in a normal running state of the vehicle, such an uncontrolled sudden acceleration can not theoretically occur because the hydraulic flow control is ultimately performed by the driver's shift lever manipulation. Furthermore, even when there is a malfunction, the gear ratio is locked in third gear.

Other possible causes of uncontrolled accelerations of these vehicles are thought to be as follows:

first, a speed range shift due to select lever manipulation while the accelerator is depressed;

second, a speed range shift when the idle rpm of the engine is above normal due to an insufficient warm up of the engine;

third, a malfunction of the ECU caused by the driver's habitual tapping on the acceleration pedal, which temporarily increases the engine rpm;

and finally, a speed range shift that occurs if the vehicle is started without depressing the brake pedal, a situation in which the engine rpm rises temporally to compensate for the load generated during a speed range shift.

Recently, various technologies for preventing the vehicle's uncontrolled acceleration have been proposed. Most of the uncontrolled acceleration preventing technologies adapt a method for the analysis of the vehicle speed, the gear ratio of the transmission, and the engine rpm so as to adjust the engine performance if any unbalance is detected.

However, electrical analysis technologies for adjusting engine rpm use electrical circuit devices for detecting a failure. Hence, such devices are also susceptible to the effects of electromagnetic waves.

SUMMARY OF THE INVENTION

The present invention has been made in an effort to solve the above problems of the prior art.

It is an object of the present invention to provide an power supply system for preventing an uncontrolled acceleration which is mechanical in nature so as not to be affected by outside electromagnetic waves, and acts such that the power supply system stops the engine when the vehicle achieves an abnormal acceleration.

To achieve the above object, an automotive power supply system for preventing uncontrolled acceleration comprises a battery, an ignition switch electrically connected to the battery, and an acceleration response switch provided between the battery and the ignition switch.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will be described hereinafter with reference to the accompanying drawings. The terms "front" and "rear" as used herein shall mean and refer to the respective forward and rearward directions of the vehicle body FIG. 1 is a schematic view showing an automotive power supply system for preventing uncontrolled acceleration according to the preferred embodiment of the present invention.

Figure 1:
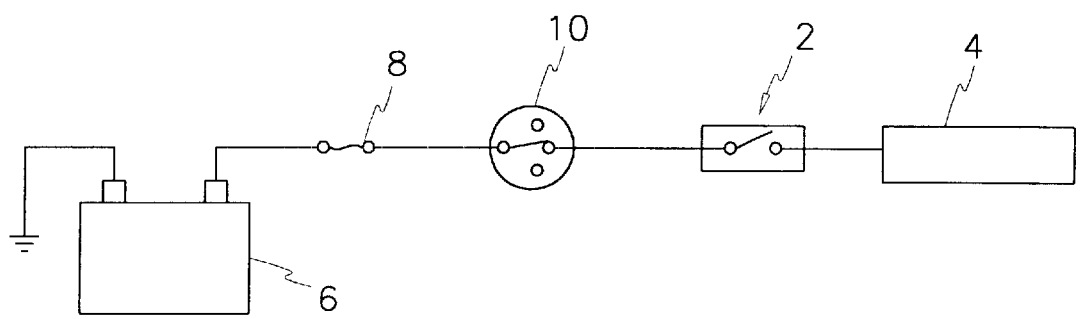
FIG. 1 is a schematic view showing a power supply system for preventing uncontrolled acceleration according to the present invention.

As shown in FIG. 1, the power supply system for preventing uncontrolled acceleration has an acceleration-response switch 2, which is provided in an electric circuit line for ignition system 4, for responsively reacting to a sudden acceleration.

The ignition system 4 of an engine is connected to a battery 6 through a fuse 8 and an ignition switch 10. The acceleration-response switch 2 is provided in the circuit line between the ignition system 4 and the ignition switch 10.

Figure 2:
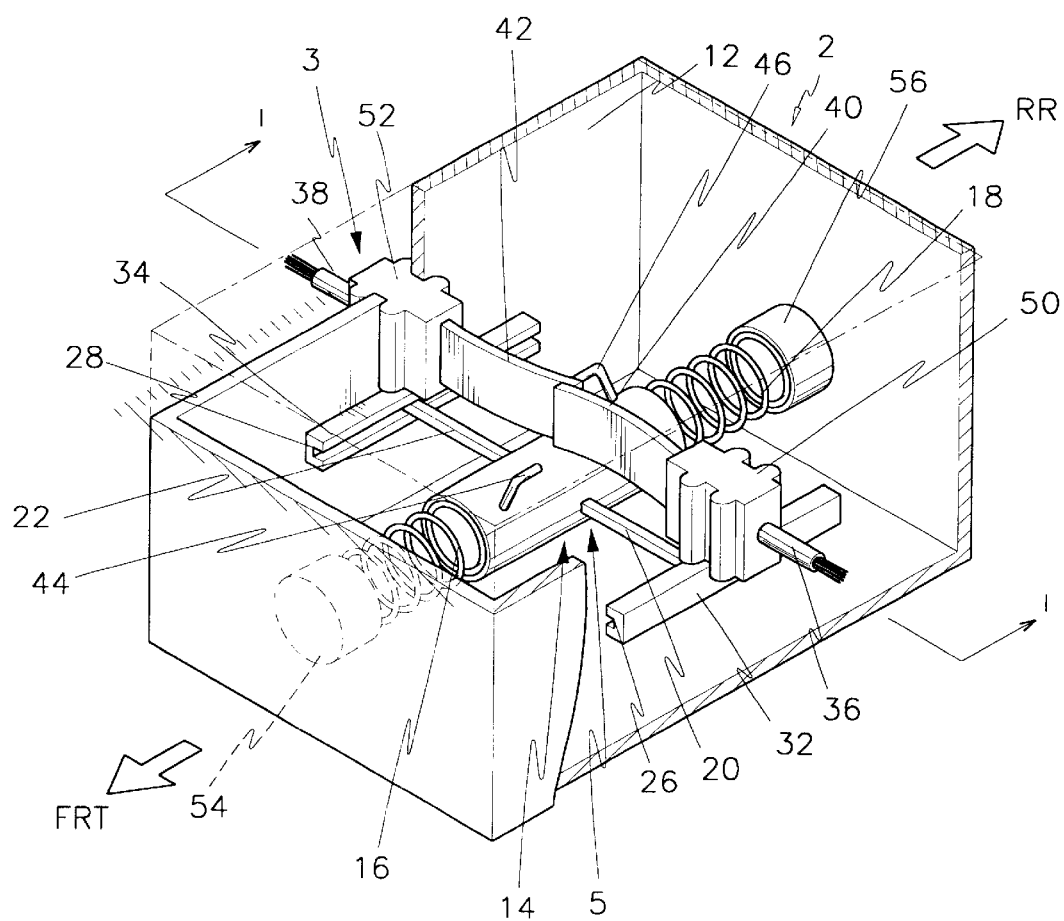
FIG. 2 is a perspective partial cutaway view of an acceleration response switch adapted to the power supply system of FIG. 1 for preventing uncontrolled acceleration.
Figure 3:
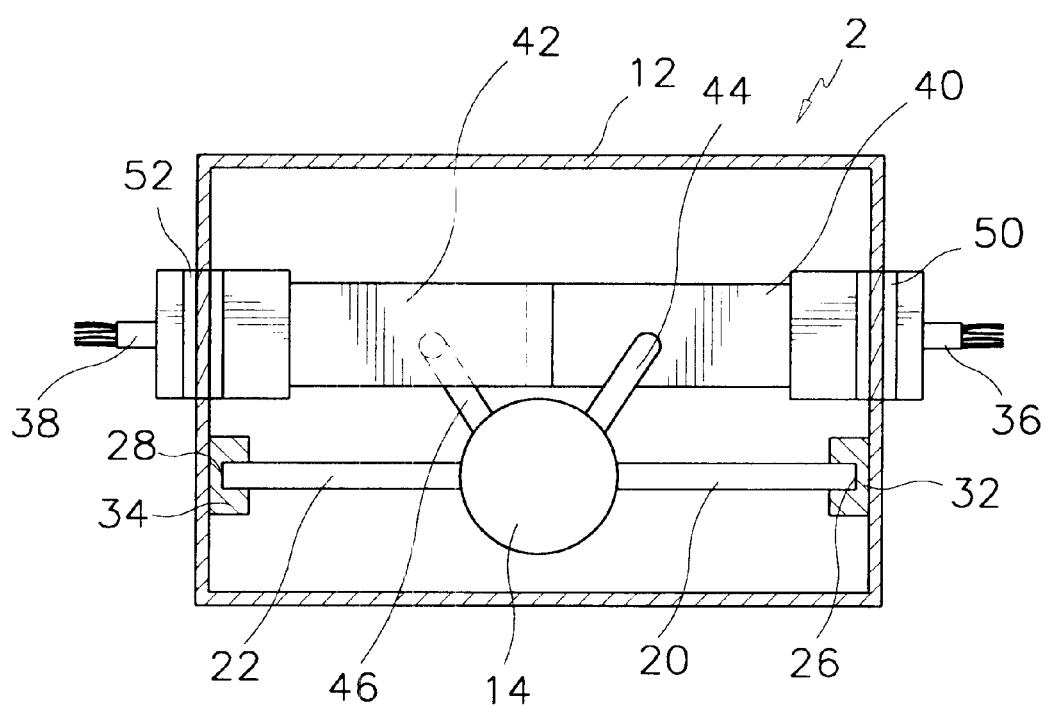
FIG. 3 is a cross-sectional view cut along a line I—I of FIG. 2.

As shown in FIG. 2 and FIG. 3, the acceleration-response switch 2 comprises a case 12, a sudden-acceleration detector 3, and a cutoff switch 5. The sudden-acceleration detector 3 and the cutoff switch 5 are installed in the case 12.

The sudden-acceleration detector 3 is mounted in a lower portion of the case 2 and includes a weight member 14, a pair of coil springs 16 and 18, and a pair of guide bars 20 and 22. The weight member 14 is a cylinder, each end of which having a recess such that one end of each coil spring 16 is secured therein. The other ends of the coil springs 16 and 18 are respectively secured in spring seats 54 and 56 formed on front and rear walls of the case 12. The ends of the guide bars 20 and 22 are oppositely fixed to a longitudinal center portion of the cylindrical weight member 14, and the other free ends of the guide bars 20 and 22 are slidably inserted into guide grooves 26 and 28 oppositely formed on inner walls of guide rails 32 and 34 such that the weight member 14 can slide in the front and rear directions. The guide rails 32 and 34 are fixedly mounted on the side walls of the case 12, and the guide bars 20 and 22 also act as supports for preventing the weight member from drooping so that the weight member 14 can not move in the upward and downward or in the left and right directions, but only in the front and rear directions. The coil springs 16 and 18 have a same elastic force such that the weight member 14 is normally in a neutral position by balanced elastic forces of the coil springs 16 and 18, and when a sudden acceleration exceeding a predetermined instantaneous acceleration occurs, the weight member 14 moves in an opposite direction of the inertia associated with the acceleration. On the upper surface of the weight member 14, a pair or protrusions 44 and 46, each having the shape of "L," are formed in such a way that each protrusion can push a corresponding plate spring (see FIG. 3) of the cutoff switch 5 so as to cut an electrical connection of the cutoff switch 5 when sudden-acceleration is detected.

Figure 4:
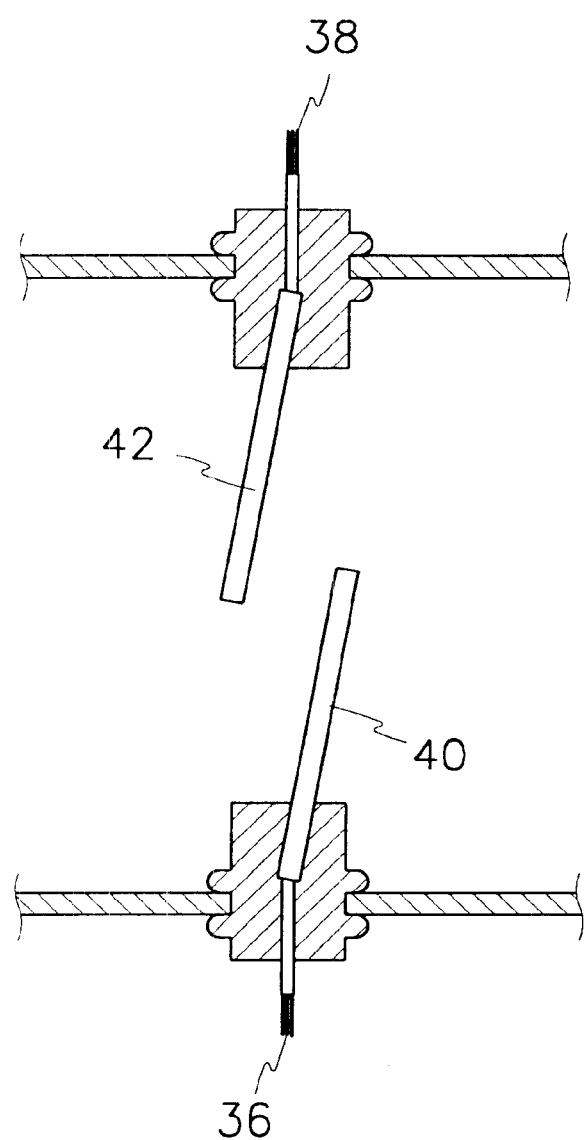
FIG. 4 is a cross-sectional view showing a pair of plate springs adapted to the acceleration responsive switch according to a first preferred embodiment of the present invention.

The cutoff switch 5 is mounted in the upper portion of the case 2 and includes a pair of plate springs 40 and 42 arranged at a right angle to the movement direction of the weight member 14. One end of each spring is respectively connected to the ends of electric cables 36, 38 from the ignition switch 10 and the ignition system 4, and the other ends of the plate springs 40 and 42 are connected to each other so as to form an electrical connection. The plate springs 40 and 42 are respectively fixed on the left and right walls of the case 2 by means of fixing member 50 and 52 in a predetermined angle to the left and right walls of the case 2 such that the ends of the plate springs 40 and 42 do not touch each other when they are not deflected (see FIG. 4).

Figure 5:
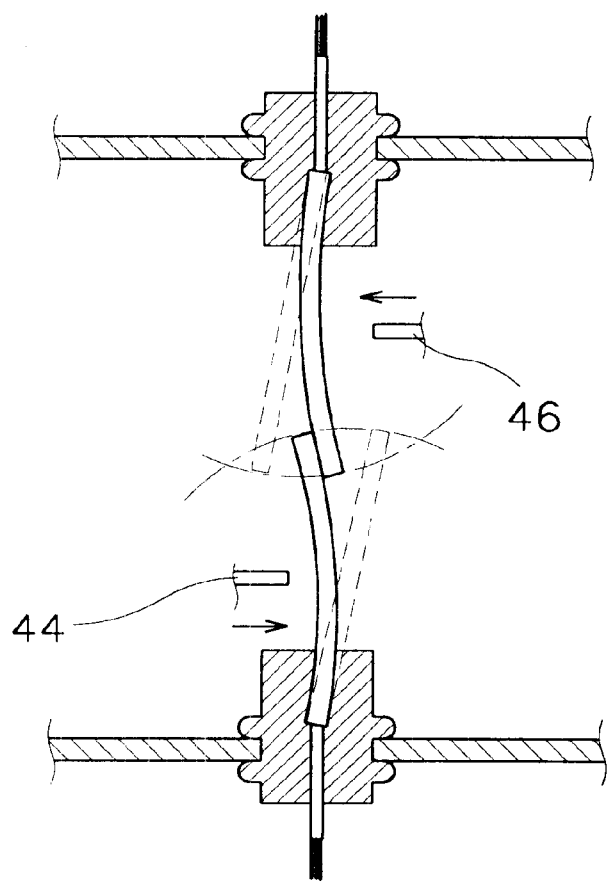
FIG. 5 is a drawing showing operation of the plate springs of FIG. 4 according to the first preferred embodiment of the present invention.

However, the plate springs 40 and 42 are preset in such a way that the free ends of the plate springs 40 and 42 are set askew so as they contact each other under their own elastic forces in such a manner that the electrical connection between the ignition switch 10 and the ignition system 4 is established (see FIG. 5).

The cutoff switch 5 is positioned in such a way that the contacted plate springs 40 and 42 are located between the protrusions 44 and 46 in a predetermined distance therefrom. In this configuration, the protrusions 44 and 46 impact the plate springs when the weight member 14 moves in either the front or rear directions due to a sudden acceleration such that the touching end portions of the plate springs 40 and 42 are separated after passing across each other.

That is, the acceleration response sensor 2 is formed in such a way that the weight member 14 having a predetermined weight is suspended from the springs 16 and 18 having a predetermined spring constant such that when the vehicle's acceleration is over a critical acceleration value, the weight member 14 push the plate springs 40 and 42, resulting in the breaking of their contact.

In the uncontrolled acceleration control system according to the first preferred embodiment of the present invention, since the elastically contacted plate springs of the cutoff switch are separated by the movement of the weight member when the vehicle's acceleration exceed a critical acceleration regardless of its cause, the electrical connection between the ignition switch and the ignition system is broken. Accordingly, the engine cuts off so as to interrupt the sudden acceleration.

Figure 6:
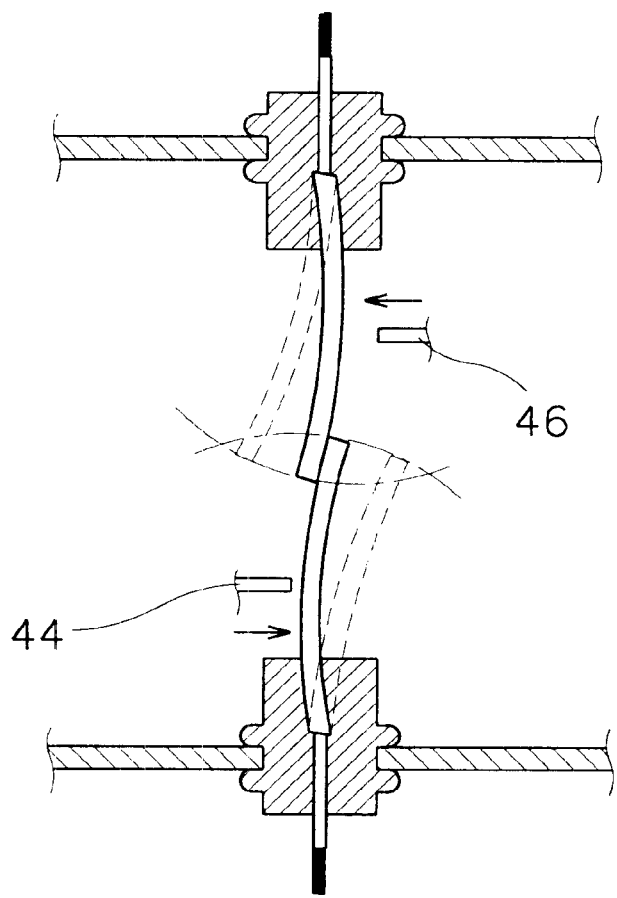
FIG. 6 is a drawing showing operation of the plate springs of FIG. 4 according to a second preferred embodiment of the present invention.

FIG. 6 a shows the action of the plate springs 44 and 46 according to a second preferred embodiment of the present invention.

In the first preferred embodiment, once the plate springs of the cutoff switch are separated by the movement of the weight member, the electrical connection cannot be reestablished. On the other hand, in the second preferred embodiment, after the plate springs are separated, the connection between the plate springs is restored.

That is, once the weight member 14 moves so as one of the protrusions 44 or 46 of the weight member push one of the corresponding plate springs such that the plate springs are separated, the plate springs are then reconnected by their own elastic forces if the weight member returns to its neutral position, As described above, in the power supply system for preventing uncontrolled acceleration of the present invention, the cutoff switch is mechanically operated when the vehicle's acceleration exceed a critical acceleration so that it is not affected by exterior factors such as a electromagnetic waves, temperature, and humidity.

While this invention has been described in connection with what is presently considered to be the most practical and preferred embodiment, it is to be understood that the invention is not limited to the disclosed embodiments. On the contrary, this invention is intended to cover various modifications and equivalent arrangements included within the spirit and scope of the appended claims.

What is claimed is:

1. An automotive power supply system for preventing uncontrolled acceleration comprising:
   a battery;
   an ignition switch of an ignition system electrically connected to the battery;
   an acceleration response switch provided between the battery and the ignition switch, the acceleration response switch including:
      a case;
      a pair of guide rails mounted on respective side walls of the case, the guide rails running parallel in a longitudinal direction of the case;
      a sudden acceleration detector provided between the guide rails in the case for detecting a sudden acceleration of the vehicle; and
      a cutoff switch provided above the sudden acceleration detector for cutting off an electrical connection between the ignition switch and the ignition system in accordance with an operation of the sudden acceleration detector, the cutoff switch including a pair of elastic conductive plates positioned between a pair of protrusions formed on a weight member connected to the guide rails, such that one of the protrusions impacts a corresponding plate when the weight member moves in a longitudinal direction due to a sudden acceleration.

2. An automotive power supply system of claim 1 wherein the cutoff switch comprises the pair of elastic conductive plates, one of the ends of which are respectively electrically connected to the ignition switch and the ignition system and other ends of which are elastically contacted with each other so as to allow the flow of electric current, the cutoff switch being fixed to left and right walls of the case by means of a pair of fixing members.

3. An automotive power supply system of claim 2 wherein the elastic conductive plates are plate springs.

4. An automotive power supply system for preventing uncontrolled acceleration comprising:

the battery;

an ignition switch of an ignition system electrically connected to the battery;

an acceleration responses switch provided between the battery and the ignition switch, the acceleration response switch including:

a case;

a pair of guide rails mounted on respective side walls of the case, the guide rails running parallel in the longitudinal direction of the case;

a sudden acceleration detector provided between the guide rails in the case for detecting a sudden acceleration of the vehicle; and a cutoff switch provided above the sudden acceleration detector for cutting off an electrical connection between the ignition switch and the ignition system in accordance with an operation of the sudden acceleration detector, the cutoff switch including a pair of elastic conductive plates positioned between a pair of protrusions formed on a weight member connected to the guide rails, such that one of the protrusions impacts a corresponding plate when the weight member moves in a longitudinal direction due to a sudden acceleration;

wherein the sudden acceleration detector includes:

a weight member which is connected in a slide like manner to the guide rails;

a pair of elastic members, one of the ends of which are fixed to seats formed on longitudinal end surfaces of the weight member and other ends of which are fixed on spring seats formed on front and rear walls of the case such that the weight member is positioned at a center portion during normal accelerations; and a pair of protrusions, the first protrusion of which is formed at the front portion and the second protrusion is formed at rear on the surface of the weight member such that free ends of the protrusions are oppositely oriented toward each other.

5. An automotive power supply system of claim 4 wherein the elastic members are coil springs.

6. The automotive power supply system of claim 4, wherein guide bars connect the weight member to the guide rails, each guide bar being fixed at its one end to an outer surface of the weight member and inserted at its free end into a groove formed on an inner wall of a corresponding guide rail such that the weight member can move in a front and rear direction of the vehicle.

7. The automotive power supply system of claim 4 wherein the pair of protrusions are a pair of "L" shape protrusions, the first protrusion of which is formed at the front right portion and the second protrusion is formed at rear left on the upper surface of the weight member such that free ends of the protrusions are oppositely oriented toward each other.

* * * * *